US007257131B2

(12) United States Patent
Smith

(10) Patent No.: US 7,257,131 B2
(45) Date of Patent: Aug. 14, 2007

(54) SYSTEM AND METHOD FOR COMMUNICATING TRAFFIC BETWEEN A CELL SITE AND A CENTRAL OFFICE IN A TELECOMMUNICATIONS NETWORK

(75) Inventor: Malcolm M. Smith, Calgary (CA)

(73) Assignee: Cisco Technology, Inc., San Jose, CA (US)

( * ) Notice: Subject to any disclaimer, the term of this patent is extended or adjusted under 35 U.S.C. 154(b) by 1109 days.

(21) Appl. No.: 10/318,835

(22) Filed: Dec. 13, 2002

(65) Prior Publication Data

US 2004/0114623 A1 Jun. 17, 2004

(51) Int. Cl.
*H04J 3/16* (2006.01)
*H04J 3/02* (2006.01)
*H04H 1/00* (2006.01)

(52) U.S. Cl. .................. 370/466; 370/338; 370/537; 370/395.42

(58) Field of Classification Search ............. 370/466, 370/467, 469, 395.42, 338, 252, 395.6, 395.52, 370/395.4, 395.1, 474, 537
See application file for complete search history.

(56) References Cited

U.S. PATENT DOCUMENTS

| 5,526,397 | A   |   | 6/1996  | Lohman ............... 379/58      |
|-----------|-----|---|---------|-----------------------------------|
| 5,655,215 | A   | * | 8/1997  | Diachina et al. ....... 455/426.1  |
| 5,721,726 | A   |   | 2/1998  | Kurnick et al.                    |
| 5,825,776 | A   |   | 10/1998 | Moon ................... 370/437   |
| 6,075,788 | A   |   | 6/2000  | Vogel                             |
| 6,081,536 | A   |   | 6/2000  | Gorsuch et al.                    |
| 6,112,245 | A   |   | 8/2000  | Araujo et al.                     |
| 6,148,010 | A   |   | 11/2000 | Sutton et al.                     |
| 6,195,346 | B1  |   | 2/2001  | Pierson, Jr.                      |
| 6,301,229 | B1  | * | 10/2001 | Araujo et al. ........... 370/252  |
| 6,526,281 | B1  |   | 2/2003  | Gorsuch et al.                    |
| 6,574,224 | B1  | * | 6/2003  | Brueckheimer et al. . 370/395.6   |
| 6,618,383 | B1  | * | 9/2003  | Tomlins ................ 370/395.5 |

(Continued)

FOREIGN PATENT DOCUMENTS

EP 0 939 575 A1 9/1999

OTHER PUBLICATIONS

PCT Notification of Transmittal of The International Search Report or the Declaration dated Aug. 31, 2004 for PCT/US03/36621.

*Primary Examiner*—Sonny Trinh
(74) *Attorney, Agent, or Firm*—Baker Botts L.L.P.

(57) ABSTRACT

A communication system includes a cell site router that receives a voice traffic stream in a layer two based protocol. The cell site router removes redundant information to generate a compressed stream of payloads from the layer two based protocol voice traffic stream. The cell site router sorts each payload of the compressed stream according to its intended destination and generates a layer two packet for each group of payloads of the compressed stream having a same intended destination. The cell site router prioritizes for transmission each layer two packet with other packets not carrying the voice traffic stream and having the same intended destination The communication system also includes an aggregation node that receives packets from the cell site router. The aggregation node separates layer two packets from the other packets and extracts each payload from each of the layer two packets. The aggregation node decompresses each payload carried by the layer two packet and forwards each payload towards its intended destination.

25 Claims, 2 Drawing Sheets

U.S. PATENT DOCUMENTS

| | | |
|---|---|---|
| 7,012,922 B1 * | 3/2006 | Unitt et al. .............. 370/395.1 |
| 7,039,034 B2 * | 5/2006 | Dick et al. ................. 370/338 |
| 7,046,669 B1 * | 5/2006 | Mauger et al. ............ 370/393 |
| 7,054,320 B1 * | 5/2006 | Lee et al. ................ 370/395.6 |
| 2001/0004355 A1 | 6/2001 | Galyas et al. ............... 370/329 |
| 2001/0055300 A1 * | 12/2001 | Chen .......................... 370/352 |
| 2003/0189922 A1 * | 10/2003 | Howe ......................... 370/352 |
| 2006/0062253 A1 * | 3/2006 | Chinnaiah et al. ......... 370/474 |

* cited by examiner

SYSTEM AND METHOD FOR COMMUNICATING TRAFFIC BETWEEN A CELL SITE AND A CENTRAL OFFICE IN A TELECOMMUNICATIONS NETWORK

TECHNICAL FIELD OF THE INVENTION

The present invention relates in general to communications signal transport and processing and more particulary to a system and method for communicating traffic between a cell site and a central office in a telecommunications network.

BACKGROUND OF THE INVENTION

Current Radio Access Network (RAN) products are focused on the transport of traffic from the cell site where the base transceiver station (BTS) is located to the central office (CO) site where the base station controller (BSC) is located. As of now, only Layer 3 solutions, such as Internet Protocol (IP), solutions have been proposed for this space. However, the data transport requirements for the majority of traffic in a 2G/3G RAN is point to point, i.e. BSC to BTS. IP solutions add significant amounts of overhead and cost in order to be as efficient as comparable networks, such as those implementing an asynchronous transfer mode (ATM) protocol. In addition, these IP solutions rely on a RAN vendor to comply with pre-standards architecture.

SUMMARY OF THE INVENTION

From the foregoing, it may be appreciated by those skilled in the art that a need has arisen for a technique to effectively transport information between a base station transceiver and a base station controller in a telecommunications network without requiring a change in the radio access network equipment. In accordance with the present invention, a system and method for communicating traffic between a cell site and a central office in a telecommunications network are provided that substantially eliminate or greatly reduce disadvantages and problems associated with convention backhaul communication techniques.

According to an embodiment of the present invention, there is provided a system for communicating traffic between a cell site and a central office in a telecommunications network that includes a cell site router that receives a voice traffic stream in a layer two based protocol. The cell site router removes redundant information to generate a compressed stream of payloads from the layer two based protocol voice traffic stream. The cell site router sorts each payload of the compressed stream according to its intended destination and generates a layer two packet for each group of payloads of the compressed stream having a same intended destination. The cell site router prioritizes for transmission each layer two packet with other packets not carrying the voice traffic stream and having the same intended destination The communication system also includes an aggregation node that receives packets from the cell site router. The aggregation node separates layer two packets from the other packets and extracts each payload from each of the layer two packets. The aggregation node decompresses each payload carried by the layer two packet and forwards each payload towards its intended destination.

The present invention provides certain technical advantages over conventional backhaul communication techniques. For example, one technical advantage is to provide a layer two based solution for the backhaul transport. Another technical advantage is to eliminate any cooperation from radio access network vendors in order to interwork with their equipment. Yet another technical advantage is to provide a compression scheme that allows packet based backhauls to be integrated with and efficiently carried over an Internet Protocol based backhaul. Certain embodiments of the present invention may include all, some, or none of these technical advantages. Moreover, other examples of technical advantages may be readily ascertained by those skilled in the art from the following figures, description, and claims.

BRIEF DESCRIPTION OF THE DRAWINGS

For a more complete understanding of the present invention and the advantages thereof, reference is now made to the following description taken in conjunction with the accompanying drawings, wherein like reference numerals represent like parts, in which.

DETAILED DESCRIPTION OF THE INVENTION

Figure 1:
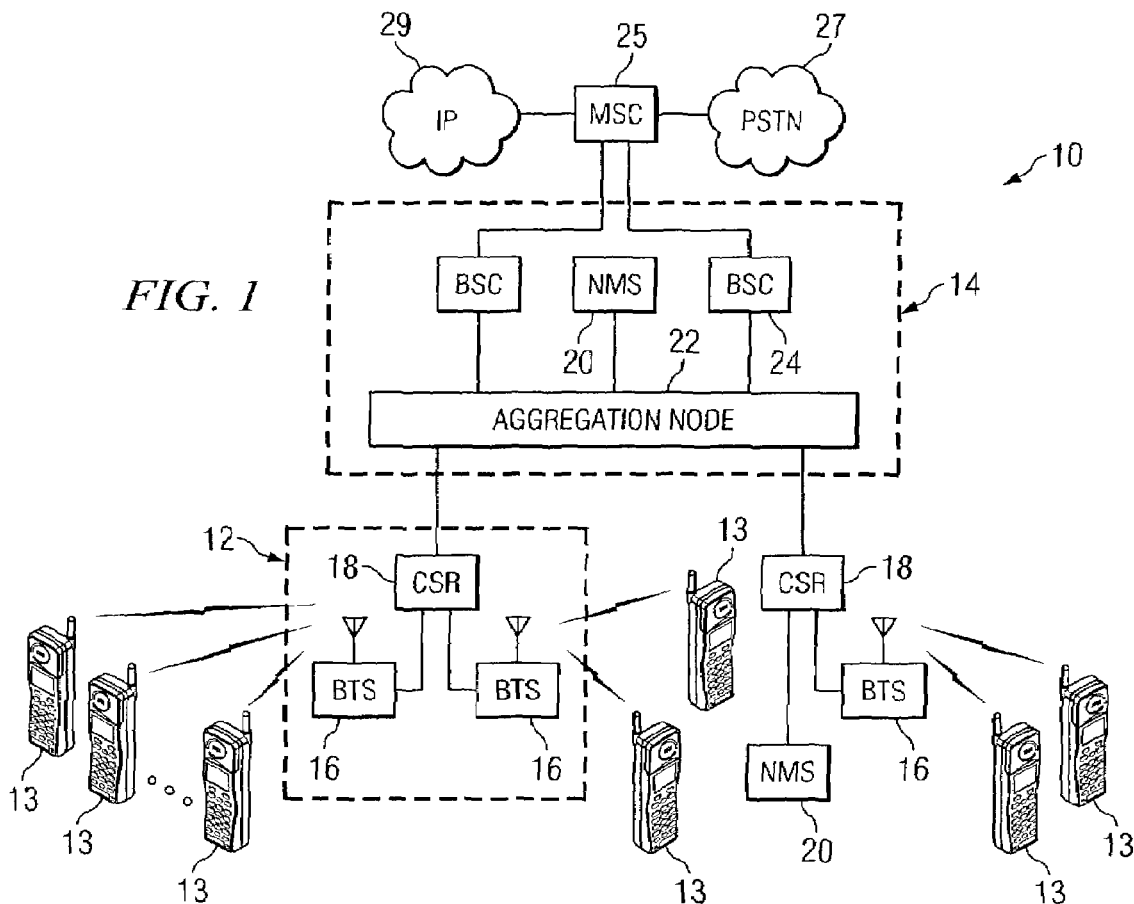
FIG. 1 illustrates a block diagram of a wireless communications system.

FIG. 1 shows an example wireless communications system 10. Communications system 10 includes a plurality of cell sites 12 communicating with subscriber units 13 using base transceiver stations 16 and cell site routers 18. A central office site 14 uses an aggregation node 22 and a base station controller 24 for communicating with cell site 12. Communications system 10 may include one or more network management systems 20 coupled to either cell site 12 and central office site 14 or both as desired. A mobile switching center 25 provides an interface between base station controller 24 of central office site 14 and a public switched telephone network 27, an Internet protocol network 29, and/or any other suitable communication network. Base transceiver station 16 may be coupled to cell site router 18 by a T1 line or any other suitable communication link. Similarly, base station controller 24 may be coupled to aggregation node 22 by a T1 line or suitable communication link. A backhaul connection between cell site router 18 and aggregation node 22 may also include a T1 line or any suitable communication link.

In operation, layer two based traffic is sent by each base transceiver station 16 to cell site router 18 of cell site 12. Cell site router 18 may also receive Internet Protocol or Ethernet traffic from a network management system 20. Cell site router 18 multiplexes together payloads from the layer two based traffic that have a common destination. The multiplexed payloads as well as any payloads extracted from the network management system IP or Ethernet traffic are sent across a link to aggregation node 22 within central office site 14. Aggregation node 22 demultiplexes the payloads for delivery to an appropriate base station controller 24 or network management system 26.

Figure 2:
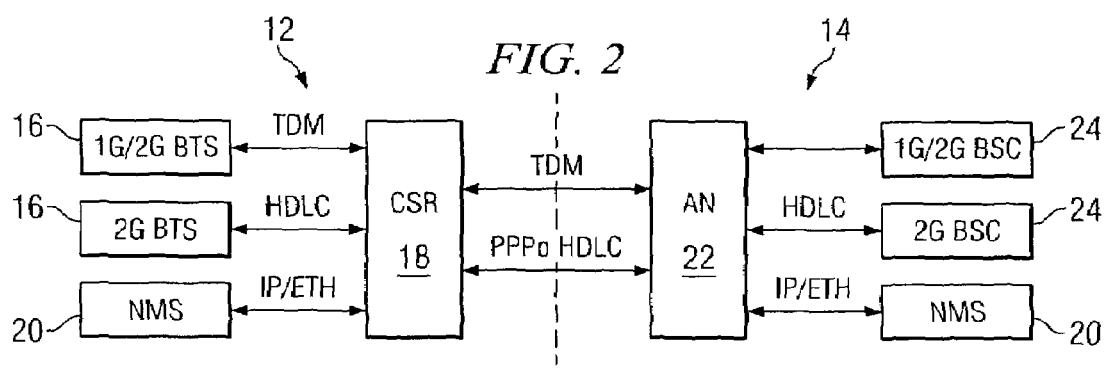
FIG. 2 illustrates an example traffic flow in the communications system.

FIG. 2 shows an example traffic flow in communications system 10. For discussion purposes only, a specific layer two based approach implementing a high level data link control (HDLC) protocol is presented. However, other types of layer two based protocols may be used herein with equal effectiveness. The layer two based approach is a compression scheme that allows existing packet based back haul transport protocols, shown here as HDLC, to be integrated with and efficiently carried over an IP based back haul transport mechanism. In the upstream direction from subscribers 13, the HDLC compression scheme includes several HDLC based trunk source links from base transceiver stations 16 to cell site router 18. Payloads from traffic carried on the HDLC trunk source links are extracted, compressed, and multiplexed by cell site router 18 and placed into a point to point protocol (PPP) packet for transport to aggregation node 22. Aggregation node 22 extracts individual payloads from the PPP packet for distribution to the appropriate base station controller 24. In the downstream direction to subscribers 13, the HDLC compression scheme works in a similar manner as aggregation node 22 and cell site router 18 include appropriate protocol stacks to process HDLC payloads.

Figure 3:
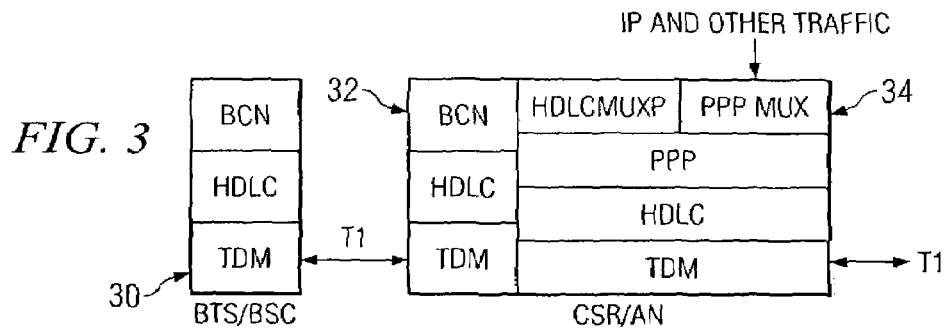
FIG. 3 illustrate example the protocol stacks at a cell site router and an aggregation node of the communications system.

FIG. 3 shows the protocol stacks at both cell site router 18 and aggregation node 22. A radio access protocol stack 30 terminates at the respective base transceiver station and base station controller side of communications system 10. An equipment protocol stack 32 terminates on the respective equipment input and output side of cell site router 18 and aggregation node 22. A back haul protocol stack 34 terminates on the back haul link side of cell site router 18 and aggregation node 22. HDLC frames from a source link are received at cell site router 18. Cell site router 18 ignores any inter-frame fill, strips off the HDLC header, and passes the payload to the HDLCmux stack for multiplexing with other HDLC frames destined for the same destination link. HDLCmux frames are transported over the back haul link between cell site router 18 and aggregation node 22 using the standard PPP stack and are mixed with other non-HDLC frames. The HDLCmux stack at aggregation node 22 delivers individual HDLC payloads over the appropriate destination link to a base station controller 24 by re-inserting the inter-frame fill and HDLC header.

In a 2G environment, HDLC payloads are preferably given a higher priority over other types of payloads. HDLC payloads tend to carry voice traffic while other types of payloads are presumed to carry non-real time management and control information. Thus, during the mixing of HDLCmux frames with other non-HDLCmux frames, HDLCmux frames are given a fixed scheduling priority which is preferably the highest priority in order to minimize voice traffic delay. Layer three maximum transport unit and layer two maximum receive unit values may be adjusted to ensure that the delay requirements for HDLC payloads are met. Given that ninety percent or more of the traffic in a 2G application will be HDLC, no quality of service techniques may be required but are provided nonetheless. Since each HDLC frame from a given source link is processed and sent to the back haul link in order, in sequence delivery of HDLC frames is guaranteed in this implementation unless the back haul link causes re-ordering. This will only occur if the link bandwidth is greater than the bit transmit time of the layer two maximum receive unit.

Figure 4A:
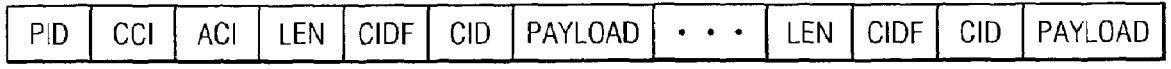
FIGS. 4A-B illustrate examples of HDLCmux packets carried by the communications system.
Figure 4B:
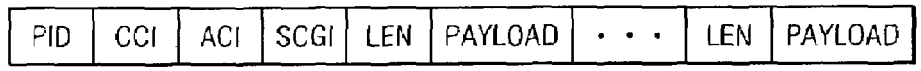

FIGS. 4A-B show examples of HDLCmux packets. FIG. 4A shows a packet format 40 for simple cross-connection and Address/Control Field (ACF) preservation. FIG. 4B shows a packet format 42 for groups of compressed base station communication network (BCN) flows. The information fields for both packet formats include a PPP protocol identifier (PID), a cross connect identifier (CCI), an ACF combination identifier (ACI), a length indicator (LEN), and payload. Packet format 40 also includes a context identifier flag (CIDF) and a context identifier (CID). Packet format 42 also includes a super charged group identifier (SCGI). The PID field determines whether the packet has packet format 40 or packet format 42. The CCI field includes bits indicating the source to destination cross-connect. The ACI field indicates HDLC address/control field combinations. An ACI of zero indicates that ACF preservation is not required for this stream. The LEN field indicates the number of bytes within the HDLC payload. The CIDF field is a flag indicating that an optional compressed BCN flow context identifier is to follow. The CID field indicates the context identifier for the BCN flow. The SCGI field indicates a number of BCN flows grouped together. The payload field carries a number of bytes of HDLC payload indicated by the LEN field with the HDLC ACF removed and also the BCN header removed for packet format 42.

Figure 5:
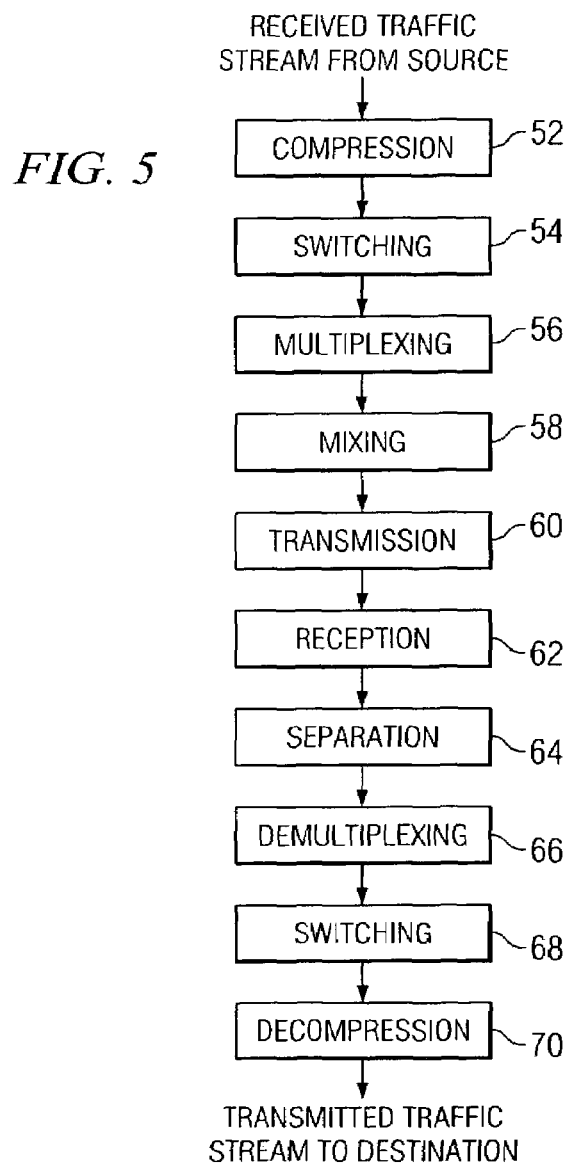
FIG. 5 illustrates process steps performed by the communications system.

FIG. 5 shows the process steps performed by communications system 10. When a stream of HDLC frames of layer two based traffic is received from a source at a compression block 52, the HDLC payload is delineated from the HDLC framing/control information. Each frame from the stream is assigned a destination link and given a CCI. If ACF preservation is specified for the source link, further separation of the HDLC frame by address/control field combination is performed and the HDLC frame is assigned an ACI. The ACF is then removed from the frame to leave the HDLC payload. If BCN flow compression is specified for this source link, the BCN header is removed and replaced with a CID. The CCI, ACI, and CID uniquely identify each HDLC payload from a source link. Based on the CCI of the HDLC payload, an output link is selected at a switching block 54. HDLC payloads destined for the same output link are multiplexed into one PPP packet at a multiplexing block 56. At a mixing step 58, a fixed scheduling priority is given to HDLCmux traffic which is preferably the highest priority in order to minimize voice traffic delay. Since voice traffic is expected to come from HDLC sources, HDLC sources are given a higher priority than PPP packets from IP and other sources. Once mixed, the PPP packet is sent to the physical/virtual interface for transmission at a transmission block 60. PPP packets are transmitted on a T1 output link.

PPP packets are received at a reception block 62 from the T1 link at either cell site router 18 or aggregation node 22 depending on packet flow direction. HDLC multiplexed PPP packets are separated from other PPP packets at a separation step 64 and given to the HDLCmux stack for processing. HDLC multiplexed PPP packets are split into one or more HDLC payloads at a demultiplexing step 66. Based on the CCI of the HDLC payload, the HDLC payload is sent to a particular destination link at a switching step 68. The CCI, ACI, and CID uniquely identify each HDLC payload from a source link that is destined for the particular destination link. Decompression of the HDLC payload is then performed at a decompression step 70. If BCN flow decompression is specified for the particular destination link, the BCN header is appended to the HDLC payload based on the CID. If ACF preservation is specified for the particular destination link, the ACI is used to determine the ACF to append to the HDLC payload. The resulting HDLC frame is encapsulated by HDLC flags and transmitted on the particular destination link. This effectively replicates the HDLC stream that was transmitted on the source link.

Since actual BCN flows on a source link are not known in advance, the BCN fields are dynamically mapped to a CID. To accomplish this, the compressor and decompressor within cell site router 18 and aggregation node 22 maintain an assigned CID set. When the compressor encounters a new BCN header, it sends a compression setup message with the BCN header and the next available CID. The decompressor stores the BCN header in the CID set and returns a compression setup acknowledge message. Once the compressor receives the compression setup acknowledge message, it will start sending CIDs instead of full BCN headers.

In a 2G CDMA configuration, the backhaul HDLC connection runs over a T1 span between base transceiver station 16 and base station controller 24. This connection carries bearer and control traffic in BCN encapsulation with specific address and flow control/priority information. Given this, the HDLC address and control fields are not required by the Radio Access Network (RAN) equipment. Thus, ACFC-like preservation is not expected in the majority of installations. As an example, Verizon's RAN uses only one address/control field in the uplink and several rotating address/control field combinations were used in the downlink.

For further optimization, the BCN header may be compressed down to zero. The BCN header is a destination tag having a 3 byte address and a 1 byte control that follows the HDLC address/control fields in a 2G CDMA RAN bearer packet. Typically, there is one BCN address for each channel card or selector card in the RAN handling in one embodiment ten voice calls. Individual flow identifiers may be eliminated during compression through BCN flow bunching, where BCN frames from the same set of voice flows occur with predictable periodicity, and utilizing the super charged compression technique.

The operation of the process steps of FIG. 5 is slightly altered when providing RAN optimization. The compressor/decompressor initially uses BCN flow identifiers (CIDs) to replace BCN headers. After a predetermined number of BCN flows occur in the time slot, they are grouped together and assigned a group ID (SCGI). The compressor establishes the SCGI by sending a super charged compression setup message that specifies the BCN flow identifiers (CIDs) that will be grouped together. Since there is no state associated with the BCN header, it is not presumed to change during the duration of a flow. Once the super charged compression acknowledge message is received by the compressor, it will begin sending type II HDLCmux packets for all traffic with the same CCI/ACI. The decompressor will append the BCN header to each HDLC payload based on the respective CID using the received SCGI.

Several multiplexing levels may be used depending on the level of compression of the HDLC frame. Cross Connect Multiplexing (CCM) results in all HDLC packets destined for the same Destination being placed into the same HDLCmux packet. The CCI for packets from the Source link has been provisioned and the ACI is 0. CCM with AFC preservation (CCMAP) results in all HDLC packets destined for the same Destination and sharing the same address/control field being placed into the same HDLCmux packet. The CCI for packets from the Source link has been provisioned and the set of possible ACIs has been configured. Super Charged BCN Flow Multiplexing (SCBFM) is the same as CCMAP plus all HDLC packets are part of the same flow set and identified by the same SCGI. Regardless of which multiplexing level is used, the same basic multiplexing thresholds, such as max_delay and super_frame_size, are used to limit the size of the HDLCmux packet.

Performance without RAN optimization assumes the use of 1 byte CCI/ACI, no ACFC preservation, a multiplexing ration of 10:1, and an average HDLC payload of 14 bytes having a 4 byte BCN header, a 2 byte bearer control, and an 8 byte voice sample. The average HDLC packet size is 14 byte payload+4 byte header=18 bytes per voice sample or 180 bytes per ten samples. Overhead reduction becomes (10*4)−(10+2) or 28 bytes per PPP packet. The average HDLCoPPPmux packet size for ten samples is 2+10*(14+1) or 152 bytes with an average of about 15 bytes per voice sample. This provides a link efficiency increase of (180−152)/180 or 16%. The old call density was (1.536 Mb per second/8 bits per byte)/(18 bytes per call*50 pps) or 213 calls per span compared to a new call density of (1.536 Mb per second/8 bits per byte)/(15 bytes per call*50 pps) or 256 calls per span, resulting in a call density improvement of (256−213)213 or about 20%. Performance using RAN optimization includes the additional assumption of a super charged compression of ten flows with the elimination of BCN header and flow identifiers and a 1 byte super charger header. The average HDLC packet size is 14 byte payload+4 byte header=18 bytes per voice sample or 180 bytes per ten samples. The average HDLCoPPPmux packet size for ten samples is 3+10*(10+1) or 113 bytes with an average of about 11 bytes per voice sample. This provides a link efficiency increase of (180−113)/180 or about 37%. The old call density was (1.536 Mb per second/8 bits per byte)/(18 bytes per call*50 pps) or 213 calls per span compared to a new call density of (1.536 Mb per second/8 bits per byte)/(11 bytes per call*50 pps) or 349 calls per span, resulting in a call density improvement of (349−213)213 or about 63%.

In summary, communications system 10 provides a transport capability that does not involve changing out existing radio access network equipment. Moreover, HDLC compression and regeneration is performed over a PPP tunnel between remotely connected nodes through an intermediate network while removing redundant HDLC traffic for bandwidth optimization. BCN and HDLC traffic flows may also be grouped and compressed in an effective manner by this technique.

Thus, it is apparent that there has been provided, in accordance with the present invention, a system and method for communicating traffic between a cell site and a central office in a telecommunications network that satisfies the advantages set forth above. Although the present invention has been described in detail, it should be understood that various changes, substitutions, and alterations may be readily ascertainable by those skilled in the art and may be made herein without departing from the spirit and scope of the present invention as defined by the following claims. Moreover, the present invention is not intended to be limited in any way by any statement made herein that is not otherwise reflected in the appended claims.

What is claimed is:

1. A system for communicating traffic between a cell site and a central office in a telecommunications network, comprising:

a cell site router operable to receive a voice traffic stream in a layer two based protocol, the cell site router operable to remove redundant information to generate a compressed stream of payloads from the layer two based protocol voice traffic stream, the cell site router operable to sort each payload of the compressed stream according to its intended destination, the cell site router operable to generate a layer two packet for each group of payloads of the compressed stream having a same intended destination, the cell site router operable to prioritize each layer two packet with other packets not carrying the voice traffic stream and having the same intended destination, the cell site router operable to transmit all packets to the intended destination;

an aggregation node operable to receive packets from the cell site router, the aggregation node operable to separate layer two packets from the other packets, the aggregation node operable to extract each payload from each of the layer two packets, the aggregation node operable to decompress each payload carried by the layer two packet, the aggregation link operable to forward each payload towards its intended destination.

2. The system of claim 1, wherein each layer two packet includes a unique layer two protocol identifier.

3. The system of claim 1, wherein each payload includes a cross connect identifier indicating the intended destination for the payload.

4. The system of claim 1, wherein the cell site router is further operable to perform address/control field preservation according to the source of the voice traffic stream.

5. The system of claim 1, wherein the layer two packets have a higher priority than the other packets.

6. A method for communicating traffic between a cell site and a central office in a telecommunications network, comprising:

receiving voice traffic stream having a layer two protocol;
compressing the voice traffic stream into a compressed stream of traffic payloads;
determining a destination for each traffic payload;
multiplexing traffic payloads having a same destination into a layer two packet;
mixing layer two packets with other packets according to a priority scheme;
transmitting the layer two packets and other packets over a communication link.

7. The method of claim 6, further comprising:
receiving layer two packets and other packets from the communication link;
separating the layer two packets from the other packets;
demultiplexing each layer two packet into one or more traffic payloads;
decompressing each traffic payload;
transmitting a voice traffic stream to a corresponding destination.

8. The method of claim 6, further comprising:
performing address/control field preservation and base station communication network compression as defined for the source of the voice traffic stream.

9. The method of claim 6, further comprising:
uniquely identifying each layer two packet and each payload according to its intended destination.

10. The method of claim 6, further comprising:
assigning a higher priority to layer two packets than two other packets.

11. A system for communicating traffic between a cell site and a central office in a telecommunications network, comprising:

means for receiving voice traffic stream having a layer two protocol;
means for compressing the voice traffic stream into a compressed stream of traffic payloads;
means for determining a destination for each traffic payload;
means for multiplexing traffic payloads having a same destination into a layer two packet;
means for mixing layer two packets with other packets according to a priority scheme;
means for transmitting the layer two packets and other packets over a communication link.

12. The system of claim 11, further comprising:
means for receiving layer two packets and other packets from the communication link;
means for separating the layer two packets from the other packets;
means for demultiplexing each layer two packet into one or more traffic payloads;
means for decompressing each traffic payload;
means for transmitting a voice traffic stream to a corresponding destination.

13. The system of claim 11, further comprising:
means for performing address/control field preservation and base station communication network compression as defined for the source of the voice traffic stream.

14. The system of claim 11, further comprising:
means for uniquely identifying each layer two packet and each payload according to its intended destination.

15. The system of claim 11, further comprising:
means for assigning a higher priority to layer two packets than two other packets.

16. A computer readable medium having code for communicating traffic between a cell site and a central office in a telecommunications network, the code operable to:
receive voice traffic stream having a layer two protocol;
compress the voice traffic stream into a compressed stream of traffic payloads;
determine a destination for each traffic payload;
multiplex traffic payloads having a same destination into a layer two packet;
mix layer two packets with other packets according to a priority scheme;
transmit the layer two packets and other packets over a communication link.

17. The computer readable medium of claim 16, wherein the code is further operable to:
receive layer two packets and other packets from the communication link;
separate the layer two packets from the other packets;
demultiplex each layer two packet into one or more traffic payloads;
decompress each traffic payload;
transmit a voice traffic stream to a corresponding destination.

18. The computer readable medium of claim 16, wherein the code is further operable to:
perform address/control field preservation and base station communication network compression as defined for the source of the voice traffic stream.

19. The computer readable medium of claim 16, wherein the code is further operable to:
uniquely identifying each layer two packet and each payload according to its intended destination.

20. The computer readable medium of claim 16, wherein the code is further operable to:
assign a higher priority to layer two packets than two other packets.

21. A device for communicating traffic between a cell site and a central office in a telecommunications network, comprising:
a site element operable to receive a voice traffic stream in a layer two based protocol, the site element operable to remove redundant information to generate a compressed stream of payloads from the layer two based protocol voice traffic stream, the site element operable to sort each payload of the compressed stream according to its intended destination, the site element operable to generate a layer two packet for each group of payloads of the compressed stream having a same intended destination, the site element operable to prioritize each layer two packet with other packets not carrying the voice traffic stream and having the same intended destination, the site element operable to transmit all packets to the intended destination.

22. The device of claim 21, wherein the site element is operable to receive packets, the site element operable to separate layer two packets from the other packets, the site element operable to extract each payload from each of the layer two packets, the site element operable to decompress each payload carried by the layer two packet, the site element operable to forward each payload towards its intended destination.

23. The system of claim 21, wherein each layer two packet includes a unique layer two protocol identifier.

24. The system of claim 21, wherein each payload includes a cross connect identifier indicating the intended destination for the payload.

25. The system of claim 21, wherein the site element is further operable to perform address/control field preservation and base station communication network compression according to the source of the voice traffic stream.

* * * * *